United States Patent [19]
McLendon

[11] Patent Number: 5,905,319
[45] Date of Patent: May 18, 1999

[54] SELF INDUCTANCE BYPASS MOTOR

[76] Inventor: Martin R. McLendon, 776 Rivertree, Oceanside, Calif. 92054

[21] Appl. No.: 09/009,460

[22] Filed: Jan. 20, 1998

Related U.S. Application Data

[63] Continuation of application No. 08/405,287, Mar. 16, 1995, abandoned, which is a continuation-in-part of application No. 07/936,123, Aug. 27, 1992, abandoned, which is a continuation-in-part of application No. 07/828,498, Jan. 31, 1992, abandoned.

[51] Int. Cl.⁶ ........................... H02K 11/00; H01R 39/46
[52] U.S. Cl. ............................................. 310/68 R
[58] Field of Search ................................ 310/68 R, 68 C, 310/220, 221; 361/23, 28, 30, 31, 33, 111, 113, 126, 127

[56] References Cited

U.S. PATENT DOCUMENTS

| | | | |
|---|---|---|---|
| 3,890,543 | 6/1975 | Jonassen | 361/56 |
| 3,924,148 | 12/1975 | Tachibana et al. | 310/220 |
| 3,968,472 | 7/1976 | Taylor | 361/56 |
| 4,437,027 | 3/1984 | Yamamoto et al. | 310/78 |
| 4,571,656 | 2/1986 | Ruckman | 361/111 |
| 4,616,286 | 10/1986 | Breece | 361/91 |
| 4,625,255 | 11/1986 | Borkowicz et al. | 361/91 |
| 4,795,951 | 1/1989 | Gaebel et al. | 318/239 |
| 4,802,055 | 1/1989 | Beckerman | 361/56 |
| 5,095,239 | 3/1992 | Wang | 310/220 |

*Primary Examiner*—Clayton LaBalle
*Attorney, Agent, or Firm*—Fitch, Even, Tabin & Flannery

[57] ABSTRACT

An electric motor has back-to-back zener diodes across each winding to short the reactance current over the threshold voltage upon polarity reversal, to serve the dual functions of reducing commutator arcing and increasing torque output by delaying the decay of the reactance current until the reversed current begins to surge after reversal. A resistor may be added in series with the series connected back-to-back zener diodes.

6 Claims, 2 Drawing Sheets

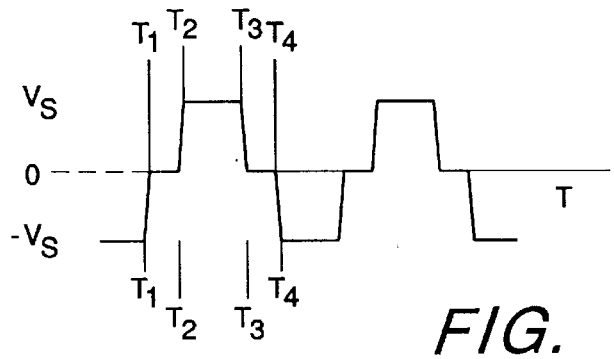
FIG. 2
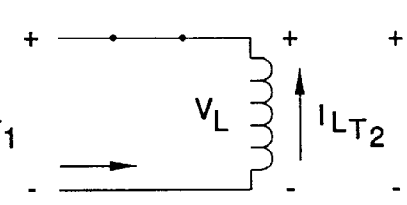 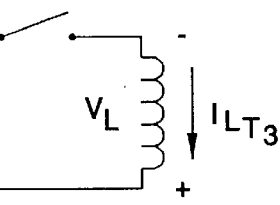
FIG. 3A    FIG. 3B    FIG. 3C
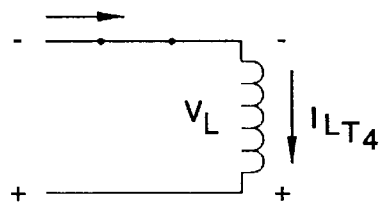         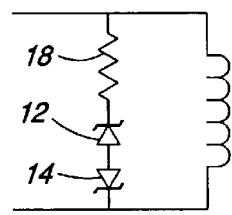
FIG. 3D              FIG. 4
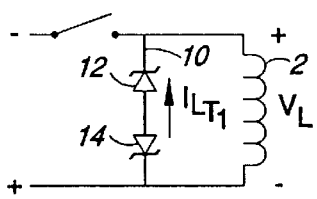 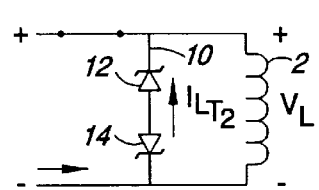 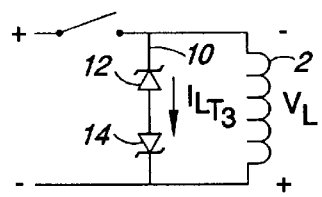
FIG. 5A    FIG. 5B    FIG. 5C
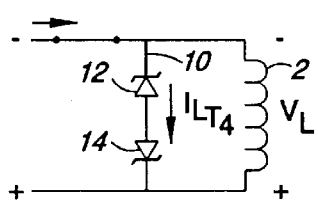         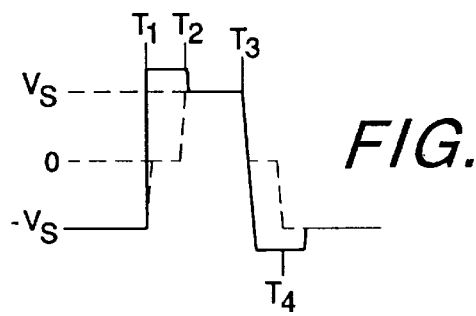
FIG. 5D              FIG. 6

SELF INDUCTANCE BYPASS MOTOR

This application is a continuation of application Ser. No. 08/405,287, filed Mar. 16, 1995, now abandoned; which is a continuation-in-part of application Ser. No. 07/936,123, filed Aug. 27, 1992, abandoned which is a continuation-in-part of application Ser. No. 07/828,498, filed Jan. 31, 1992, now abandoned.

BACKGROUND OF THE INVENTION

In electric motors and generators, and other commutating electric machinery driven by induced magnetomotive force (m.m.f.), the well-known phenomenon of armature reaction results in reduction of available torque and potential damage to the device's brushes and/or commutator. In the commutator, the cross-magnetization resulting from the magneto-motive force introduces a flux non-uniformity at the pole tip which is reduced while it increases at the opposite pole tip. Due to saturation, the decrease often exceeds the increase, leading to a net flux decrease. The voltage distribution around the commutator has the same shape as the flux wave form and, thus, also becomes irregular. The increased value of the voltage difference between commutator segments promotes sparking, arcing, or "flash-over".

Machines which are subjected to abrupt load changes are particularly susceptible to such sparking. To reduce the risk of flash-over, additional poles, or windings, are commonly incorporated into the commutator, connected in series with the armature to balance the armature m.m.f. An added advantage is that the inductance of the two windings is less than that of the armature alone, so that the sudden change of armature current is less severe. However, the addition of poles has the disadvantages of increasing the overall size and complexity of the machine, and the output power is decreased.

Various inventions have been addressed to suppression of sparking COMMUTATING electrical machines, including the use of resistance paths (U.S. Pat. No. 3,487,248 of Kaneko et at.) or quenching capacitors (U.S. Pat. No. 3,529,589 of Schaub) between commutator sections, conductive spark-quenching grease for coating the commutator sections and filing the gaps therebetween (U.S. Pat. No. 4,319,153 of Mabuchi), conductive sheets placed in flux zones to produce eddy currents which oppose flux changes (U.S. Pat. No. 3,409,788 of Taylor), resistors connected in series with brush elements (U.S. Pat. No. 3,456,143 of Uemura et al.), and a combination of an insulating washer and conductive ring adjacent to the commutator (U.S. Pat. No. 4,734,607 of Ikawa et al.).

For various reasons, the methods introduced by these patents for reducing sparking in electric machinery have not proven acceptable for most applications. Most motors and similar machines are still made which experience sparking problems, as a truly effective method of reducing sparking is not available at present. Efforts have been made to short out the coils if the reactance voltage exceeds a certain threshold. These bypass circuits include those using thermistors to establish a graduated threshold, and those which bypass the commutator segments with gas discharge tubes. Both of these methods are partially effective, and reduce arcing somewhat, but are too slow in response to be truly effective in not only reducing sparking but also increasing torque output, for which a slight delay is productive.

None of the prior art devices use zener diodes as the operative elements in spark reduction. The various prior art references set forth the following elements that ostensibly eliminate or reduce the arcing problem by connecting to the incoming ends of the windings:

A quenching capacitor;
A spark quenching grease coat;
A metal sheet in a flux zone to dissipate induced eddy currents;
Resistors;
Varistors (many);
Rotating varistor disc;
Rotating reactance disc; and
Electrically conductive rubber ring.

Thus, on the one hand, there are many motor surge supressors, although none of them uses zener diodes. On the other hand there are many circuits using zener diode voltage caps, but used for non-motor purposes. With so many zener diodes used as AC waveform clippers, one might wonder why there is not a single prior art motor using zener shunts across the windings.

It is applicant's belief that there has been an avoidance of Zeners for use in this capacity because they have no inherent overvoltage protection and are thus subject to runaway current and incineration. This is not a problem, however, as in practice the small intermittent overvoltage conditions do no harm, and if it were perceived as a problem a minimal resistor could remedy the situation.

Thermistor shunts probably come the closest to zener diode shunts in electrical response. However, zeners have no debilitating disadvantages compared to thermistors, and there are substantial advantages when used in anti-flashover commutator segment shunts. Diodes have a high resistance to shock, and military specification models withstand temperatures of over 200 degrees Celsius without damage. Both of these characteristics are considerably better than the varistor counterparts, and ideally suit the zener diode for the motor commutator application due to the constant vibration, shock, and heat.

In addition, varistors have an inherently limited lifespan because every spark destroys a microscopic piece of it. Diodes on the other hand have an indefinite lifespan, and could conceivably work for a hundred years at full capacity provided overvoltages beyond those expected were not experienced. And zener diode shunts improve efficiency. Sample test results on a dynamometer show a definite, statistically meaningful, improvement of 1% to 3% in efficiency. Applicant has run his motors long enough to know that at least with small motors durability is not a problem. Perhaps it is a belief to the contrary that has stifled development. That a government research agency has indicated the arrangement will not work suggests the possibility that inaccurate folklore may have obstructed development, teaching away from the invention.

SUMMARY OF THE INVENTION

The present invention plugs the gap in the prior art with an apparatus and method for reducing armature reaction in COMMUTATING electric machines and the sparking that can result therefrom, and causes attenuation of reactive EMF across the windings on current cessation, in such a way that resistance to start-up current at polarity reversal is reduced. This results in an increase in output torque while commutator arcing decreases, improvement in these two areas having been generally believed to be mutually exclusive.

In the preferred embodiment, two zener diodes are connected back-to-back and connected in series with a low ohmage resistor to define a bypass subcircuit and an array of such subcircuits are used with each subcircuit being wired in parallel with each winding to provide a bypass. The two zener diodes conduct alternately in response to polarity reversals when the load voltage exceeds a predetermined level. The resistor in each subcircuit is selected with a value that produces an LR circuit discharge time constant that overlaps the reverse current of the next phase to smooth the current transition and thereby elevate output torque, and to permit operation at higher potentials as needed for switching power supplies.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 2 is a plot of the voltage distribution with time across the set of windings of FIG. 1C;

FIGS. 3A through 3D are symbolic diagrams of the current flow through a winding according to the prior art;

FIG. 4 is a diagrammatic view of an alternate embodiment;

FIGS. 5A through 5D are symbolic diagrams of current flow with time through a winding/bypass arrangement according to the present invention; and FIG. 6 plots voltage distribution corresponding to current flow of FIGS. 5A through 5D.

DETAILED DESCRIPTION OF THE PREFERRED EMBODIMENTS

Figure 1A:
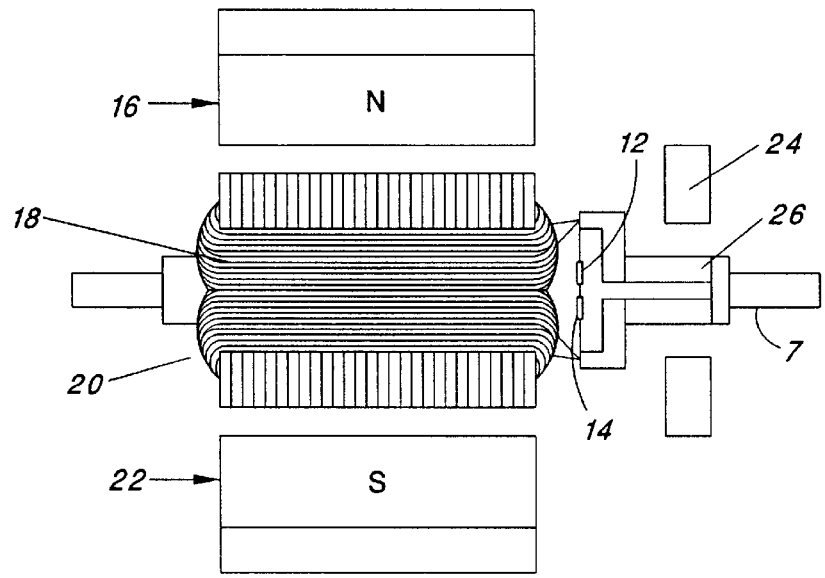
FIG. 1A is a diagrammatic view of a motor representative of the invention having bypass subcircuits across the commutator segments.
Figure 1B:
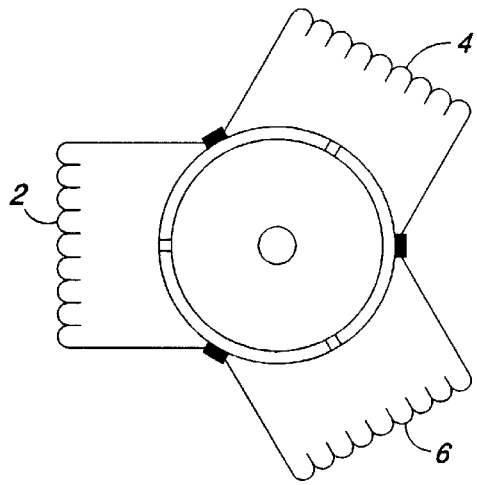
FIG. 1B is a diagrammatic view of a set of three windings on an armature.
Figure 1C:
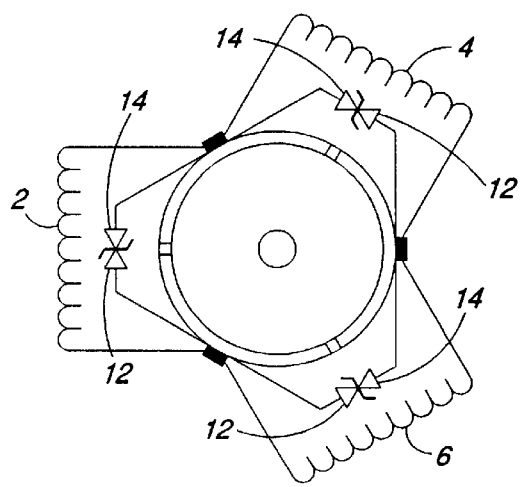
FIG. 1C is a diagrammatic view of a set of three windings on an armature with the bypass subcircuits of the invention in place.

It is well known that the number of poles and the location of the coils on the armature and their locations relative to each other will result in different m.m.f. wave and voltage distribution shapes, including square waves, stepped square waves, triangular (sawtooth) and trapezoidal waves. For illustrative purposes, the invention herein described is applied to an armature with three sets of conductors 2, 4 and 6 in an isolated coil arrangement, as shown in FIGS. 1A, 1B and 1C. The total m.m.f. wave and voltage distribution will have the shape shown in FIG. 2. The inductor reactance is evaluated by the well-known relationship $V_L = L(\Delta I/\Delta T)$. Referring, briefly, to FIG. 1A, which is a side diagrammatic view of a motor representative of the invention, shown are north and south magnets 16, 22; the armature 20; winding 18; brush 24; commutator 26; and armature shaft 7.

For analysis, the steps are broken down into time $T_1$ through $T_4$ for a single conductor 2.

During $T_1$, indicated symbolically in FIG. 3A, the source current decreases and the magnetic field changes polarity and begins to collapse. This action creates $V_L$ and an aiding current ($I_L$) which is conducted through the coil. During $T_2$, indicated in FIG. 3B, source current increases in the opposite direction. The residual energy remaining in the magnetic field will produce an opposing current ($I_L$) which will retard the source current's rise time. During $T_3$, the source current decreases, as shown in FIG. 3C. The magnetic field changes polarity and creates an aiding current ($I_L$) through the coil 2. During $T_4$, illustrated in FIG. 3D, the source current increases in the opposite direction and the residual energy remaining in the coil 2 will try to maintain an opposing current $I_L$ that will retard the source current's rise time.

According to the present invention, a circuit array consisting of a bypass subcircuit 10 for each winding is connected in parallel with coil 2 to provide the results described below. Bypass subcircuit 10 consists of two back-to-back zener diodes 12 and 14.

In an alternative embodiment illustrated in FIG. 4, a resistor 18, or other resistive element, may be added to vary the LR discharge time constant as appropriate depending upon the application.

The improved flash-over resistance results from the following responses within bypass circuit 10, illustrated in FIGS. 5A through 5D. The corresponding voltage distribution is illustrated in FIG. 6. During $T_1$, the source current decreases and the magnetic field changes polarity and begins to collapse, thereby creating $V_L$. When $V_L$ rises to the zener voltage $V_{Z12}$, zener diode 12 will break down and begin to conduct $I_L$ as illustrated in FIG. 5A.

During $T_2$, $I_L$ would normally create an opposing current to retard the source current's rise. This, however, is now bypassed so that the opposition is alleviated. The residual magnetic field will aid the incoming source current, as shown in FIG. 5B.

During $T_3$, the source current decreases, and the magnetic field changes polarity and begins to collapse. $V_L$ rises and zener diode 14 breaks down and begins to conduct $I_L$.

During $T_4$, the normally opposing $I_L$ is bypassed again and can no longer resist the incoming source current. The residual magnetic field then provides an aiding potential difference, as shown in FIG. 5D.

An additional advantage provided by the present invention is that the bypass circuit prevents $V_L$, which is normally high, form exceeding the zener breakdown voltage. Therefore, a reduction in the armature reaction and sparking is achieved.

The bypass circuit of the present invention is a simple fix to a significant problem. The bypass circuit is connected to each coil for the armature, and thus is readily balanced to avoid inducing any rotational irregularities of the rotor. The zener diodes may be implemented in the form of discrete components or as an integrated circuit. Further, any combination of discrete components or integrated circuits which have voltage regulating capability of a zener diode may be used.

It will be evident that there are additional embodiments which are not illustrated above but which are clearly within the scope and spirit of the present invention. The above description and drawings are therefore intended to be exemplary only and the scope of the invention is to be limited solely by the appended claims.

What is claimed is:

1. An improved electric motor comprising means for generating a magnetic field, an armature mounted for movement within the magnetic field, the armature including a commutator having a plurality of commutator segments, and a plurality of armature windings wound on said armature, wherein each commutator segment is connected to at least one of the armature windings for generating a magnetomotive force in the presence of the magnetic field, wherein the improvement comprises:

means for elevating output torque of the electric motor comprising;
  a plurality of bypass subcircuits, each bypass subcircuit comprising a pair of back-to-back series-connected zener diodes connected in parallel with a respective one of said armature windings; and
  a resistor in series with the respective back-to-back series-connected zener diodes of each subcircuit.

2. The electric motor as set forth in claim 1 wherein said resistor has a value selected to produce an LR discharge time constant that delays a decay of a reactance current flowing through the armature winding so as to overlap with a reverse current of an adjacent armature winding, thereby smoothing the current transition and increasing torque.

3. An improved dc electric motor that produces increased torque, said motor having means for generating a magnetic field, a rotating armature, a plurality of armature windings wound on the armature for coupling with the magnetic field, a commutator with a plurality of commutator segments, each commutator segment being connected to at least one of the armature windings, and means for applying a source voltage potential across the commutator segments so as to create a magneto-motive force that rotates the armature as a result of the interaction between the magnetic field and a source electrical current flowing through an armature winding, wherein the improvement comprises:
  means for increasing torque;
  said means for increasing torque comprising means for producing an LR circuit discharge time constant that delays the decay of a reactance current flowing through each armature winding, thereby allowing said reactance current to interact with said magnetic field for an additional time equal to the delay of the decay.

4. The improved dc motor of claim 3 wherein said means for increasing torque comprises a pair of zener diodes connected back-to-back in series at the commutator segments so as to be in parallel with each armature winding.

5. The improved dc electric motor of claim 4 further including resistance means connected in series with each of said back-to-back zener diodes for adjusting said LR circuit discharge time constant.

6. The improved dc electric motor of claim 5 wherein said resistance means comprises a resistor connected in series with each of said back-to-back zener diodes, said resistor having a value coordinated with the reactance of the respective armature winding to provide a desired LR time constant such that reactance current decay occurring on source voltage termination is extended until source current polarity reversal occurs, such that reversed source current is less opposed by reactance current than it would have been absent extension of said reactance current decay as the magnetic field collapses around the respective armature winding.

* * * * *